United States Patent
Heflinger et al.

(10) Patent No.: US 6,545,785 B1
(45) Date of Patent: *Apr. 8, 2003

(54) OPTICAL COMMUNICATION SYSTEM WITH PHASE MODULATION

(75) Inventors: Donald G. Heflinger, Torrance, CA (US); Lee O. Heflinger, Torrance, CA (US)

(73) Assignee: TRW Inc., Redondo Beach, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/285,215

(22) Filed: Apr. 1, 1999

(51) Int. Cl.[7] .................. H04B 10/00; H04B 10/04; H04B 10/06
(52) U.S. Cl. .................. 359/154; 359/156; 359/192
(58) Field of Search .................. 359/162, 183, 359/191, 154, 156, 173, 181, 192; 455/42, 523, 103, 137, 141, 151.2, 205, 259

(56) References Cited

U.S. PATENT DOCUMENTS

| | | | | |
|---|---|---|---|---|
| 3,600,587 A | * | 8/1971 | Smith .................. | 359/156 |
| 3,699,463 A | * | 10/1972 | Stone .................. | 329/300 |
| 4,769,853 A | * | 9/1988 | Goodwin et al. .......... | 359/156 |
| 4,783,852 A | * | 11/1988 | Auracher .................. | 356/484 |
| 6,147,755 A | * | 11/2000 | Heflinger et al. .......... | 356/491 |
| 6,243,168 B1 | * | 6/2001 | Heflinger et al. .......... | 356/484 |

* cited by examiner

Primary Examiner—Leslie Pascal
Assistant Examiner—Agustin Bello

(57) ABSTRACT

An optical communication system uses a radio frequency (RF) signal for communicating an analog communication signal. It comprises an optical transmitter and receiver. The transmitter generates a reference light beam, generates a shifted light beam that is shifted in frequency by the RF frequency, and responds to the analog communication signal and produces a communication light beam having a phase modulation corresponding to the analog communication signal. The optical receiver comprises first means to interferometrically combine the reference light beam with the shifted light beam to provide a first heterodyne signal, second means responsive to the first heterodyne signal to produce a first electrical signal at the optical beat frequency corresponding to the RF, third means to interferometrically combine the communication light beam with the shifted light beam to provide a second heterodyne signal including information regarding the state of phase of the communication light beam, fourth means responsive to said second heterodyne signal to produce a second electrical signal at the optical beat frequency corresponding to the RF and with a phase corresponding to the state of phase of the communication light beam, and fifth means responsive to said first and said second electrical signals to provide an output signal that has a linear correspondence to the state of optical phase of said communication light beam and the analog communication signal. Also disclosed are the transmitter and the receiver.

35 Claims, 3 Drawing Sheets

OPTICAL COMMUNICATION SYSTEM WITH PHASE MODULATION

CROSS-REFERENCE TO RELATED APPLICATIONS

This application is related to the following commonly assigned applications: "Heterodyne Wavefront Sensor", Ser. No. 09/283,604, having inventors Stephen Brosnan, Donald Heflinger and Lee Heflinger; "A Dynamic Optical Micrometer", Ser. No. 09/283,484, having inventors Donald Heflinger and Lee Heflinger; "A Dynamic Optical Phase State Detector", Ser. No. 09/282,946, having inventors Donald Heflinger and Lee Heflinger; "Improved High Average Power Fiber Laser System With High-Speed, Parallel Wavefront Sensor", Ser. No. 09/282,579, having inventors Stephen Brosnan, Donald Heflinger, and Lee Heflinger; "Linear Analog Optical Communication System With Two Transmitted Beams And Phase Modulation", Ser. No. 09/285,207, having inventors Donald Heflinger and Lee Heflinger; and "Optical Communication System With A Single Polarized, Phase Modulated Transmitted Beam", Ser. No. 09/283,053, having inventors Donald Heflinger and Lee Heflinger; filed concurrently with this patent application.

BACKGROUND OF THE INVENTION

1. Field of the Invention

The present invention is generally related to optical communication systems, and more particularly to an optical communication system utilizing phase modulation that provides substantially linear recovery of an analog communication signal.

2. Description of the Prior Art

Analog optical communication links are known in the prior art. Conventional optical analog links employ intensity modulation techniques to convey the analog information on an optical beam of light. Such analog optical links are utilized by the cable television industry to transmit video images using the conventional RF analog modulation format for television video. Intensity detection at the receiver using conventional photodetectors enables the light intensity to be linearly converted to an analog voltage corresponding to the signal that is to be transmitted by the link. However, inherent to these analog intensity modulation optical links is an acceptance of a non linearity associated with the intensity modulators used in the transmitter. Mach-Zehnder intensity modulators, which are commonly employed in optical intensity modulation analog links, have a non linear transfer function that yields a sinusoidal intensity variation with a linearly changing applied analog modulation voltage. Similarly, electro absorption modulators also yield a non linear intensity variation to a linearly applied analog modulation voltage.

This inherent non linearity associated with intensity modulators has led to a consideration of using optical phase modulation in the transmitter as an alternative to intensity modulation. Optical phase modulators that can achieve a linear change in the state of the optical phase with a linearly changing analog modulation voltage are known in the art. Modulators can be made from electro optic materials that change their refractive index linearly with applied electric field supplied by a linearly changing analog modulation voltage. The linearly changing refractive index causes the optical path length through the modulator to linearly change. This linearly changing optical path length causes a linearly changing state of optical phase corresponding with a linearly changing analog modulation voltage. Thus, an optical phase modulator can be used in the transmitter to deliver a linearly varying optical signal in contrast to the inherent non linearity associated with intensity modulators.

The utilization of a linear phase modulator in an analog optical communication link requires that the state of optical phase be detected at the receiver. Conventional approaches for this utilize optical interference techniques that cause the phase varying light to become detectable with photodetectors as intensity variations. A common approach used for optical phase state detection is to interfere the phase modulated communication light with an unmodulated reference beam of light that has been split from the initial light source prior to applying the phase modulation. The process of utilizing optical interference techniques to detect the state of optical phase leads to a non linear sinusoidal intensity variation that corresponds to the linearly varying state of optical phase. Thus, this conventional phase detection process leads to a non linearity in the detected analog signal. This non linearity inherent in the conventional phase detection process negates the linearity achieved by the phase modulator and results in an analog optical communication link that is as non linear as the conventional intensity modulation analog optical link. Thus, all analog optical communication links are degraded in performance by an inherent non linearity that distorts the original analog signal that is to be conveyed.

What is needed, therefore, is an analog optical communications system that is capable of detecting the state of optical phase of a phase modulated communication signal in a way so as to produce an analog voltage signal that is linearly related to the state of optical phase of the phase modulated optical signal. Such an analog optical communications system thus will be capable of conveying an analog signal without any non linear distortion.

SUMMARY OF THE INVENTION

The preceding and other shortcomings of the prior art are addressed and overcome by the present invention which provides generally an optical communication system for communicating an analog communication signal.

Briefly, the optical communication system comprises an optical transmitter and an optical receiver separated by an analog optical link. The transmitter comprises means for generating a reference light beam, means for generating a shifted light beam that is shifted in frequency from the frequency of said reference light beam by a predetermined radio frequency (RF) and means responsive to the analog communication signal to generate a phase modulated communication beam.

The optical receiver comprises first means responsive to the reference light beam and the shifted light beam to interferometrically combine these two beams to provide a first heterodyne signal, second means responsive to the first heterodyne signal to produce a first electrical signal at the optical beat frequency corresponding to the RF, third means responsive to the communication light beam and the shifted light beam to interferometrically combine the communication light beam with the shifted light beam to provide a second heterodyne signal including information regarding the state of phase of the communication light beam, fourth means responsive to the second heterodyne signal to produce a second electrical signal at the optical beat frequency corresponding to the RF with a phase corresponding to the state of phase of the communication light beam, and fifth means responsive to the first and second heterodyne signals to provide an output signal that corresponds to the state of optical phase of the communication light beam. More particularly, the detection of the relative phase of the RF signals is performed by a digital dividing technique that provides a high resolution determination over several optical wavelengths. Both the RF beat frequency signal and the RF modulation signal are converted to digital waveforms that are digitally divided, preferably by an equal number of powers of two, so that the resulting outputs are square waves. The divided signals are applied to an exclusive OR gate that provides a pulse waveform having a duty cycle that reflects the relative phase of the two RF frequencies. The pulse waveform is filtered to create an average voltage that linearly corresponds to the particular state of phase in the communication light beam and the analog communication signal.

Other aspects of the invention separately describe the optical transmitter and the optical receiver.

The foregoing and additional features and advantages of this invention will become apparent from the detailed description and accompanying drawing figures below. In the figures and the written description, numerals indicate the various elements of the invention, like numerals referring to like elements throughout both the drawing figures and the written description.

DETAILED DESCRIPTION OF THE PREFERRED EMBODIMENTS

Figure 1:
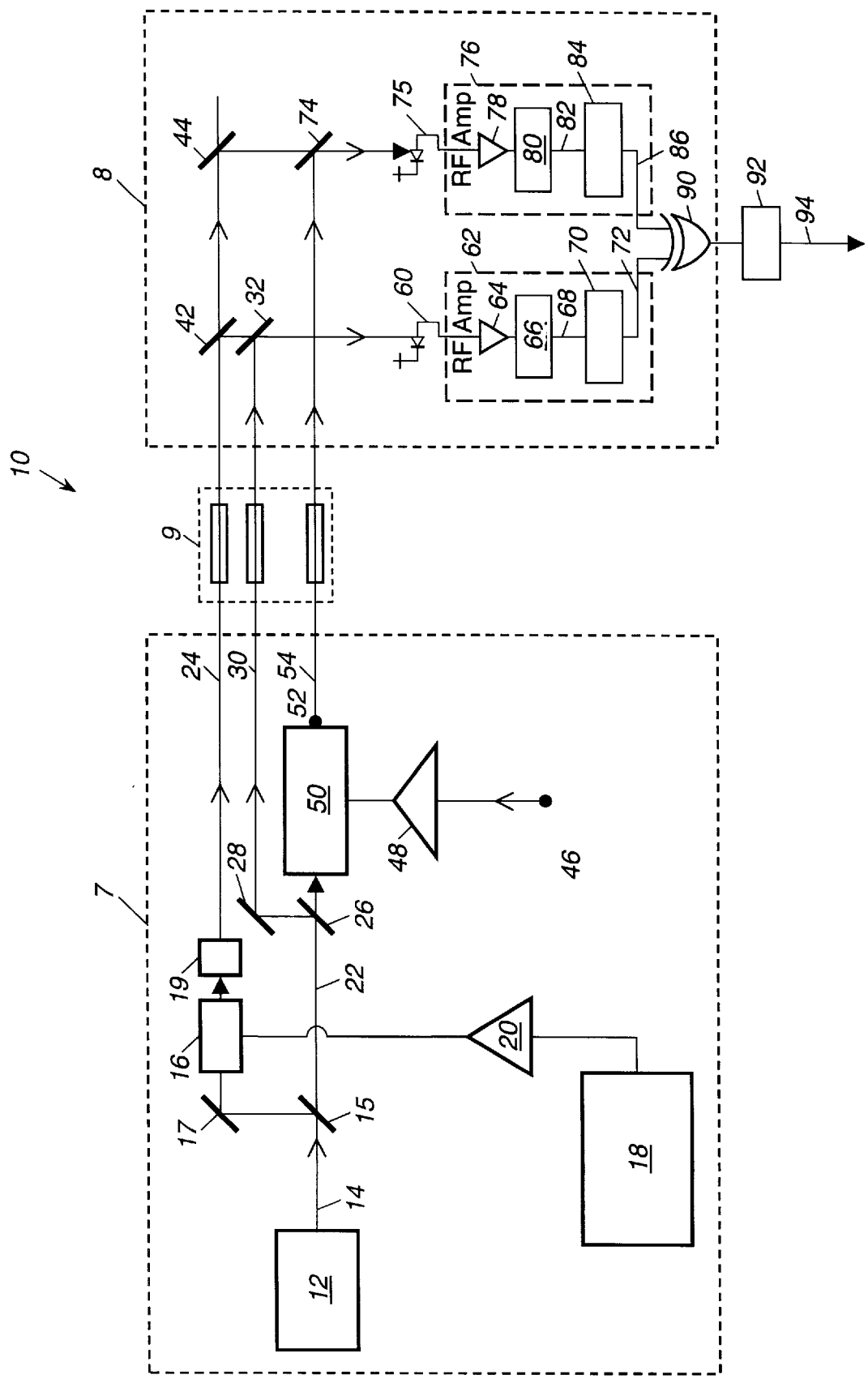
FIG. 1 is a schematic block diagram of the optical communication system in accordance with the present invention.

As illustrated in the schematic block diagram of FIG. 1, the present invention provides an optical communication system, generally designated by the numeral 10, including an optical transmitter 7 and an optical receiver 8 separated by an analog optical link 9. As will be described the optical communication system 10 produces a voltage signal that linearly corresponds to the state of phase of the phase modulated communication light beam, which in turn corresponds to the voltage of an analog communication signal. This state of phase is also referred to as a particular wavefront state. The particular embodiment shown in FIG. 1 uses free-space optical interconnections; however, as will be described, an all fiber optic embodiment is also possible.

In the optical transmitter 7 an optical source 12 generates a beam of coherent light at an optical frequency v, which is applied on an optical fiber or a free-space beam 14 to an optical frequency shifter 16. Preferably, the optical source 12 is a semiconductor laser diode such as a distributed feedback (DFB) laser, although any coherent source such as a helium neon (HeNe) laser can also be used. A portion of this light is split by a fiber optic coupler or mirror 15 which is directed by fiber or mirror 17 to an optical frequency shifter 16. A radio frequency (RF) oscillator 18 generates an RF fixed frequency electrical signal which is applied through an amplifier or RF driver 20 to the optical frequency shifter 16, and serves to create an upshifted beam of light. Preferably the RF signal is a sinusoidal signal but any fixed RF frequency may be utilized that is much higher than the highest frequencies of the analog communication signal that is applied at 46. The optical frequency shifter 16 serves to shift the optical frequency of the light beam 14 by an amount of frequency corresponding to the RF. In the preferred embodiment, the optical frequency shifter 16 is an optical modulator such as a Mach-Zehnder modulator followed by a narrow pass band optical filter 19 to extract the shifted side band light. Alternatively, the optical frequency shifter can be an acousto-optic modulator.

In the case of using a Mach-Zehnder modulator as an optical frequency shifter, the modulator is biased at the minimum light transmission so that the delivered light will be directed into just the upper and lower side bands at an optical frequency that is shifted either up or down by the RF. By filtering this light with a narrow pass band optical filter 34, such as a Fabry-Perot filter or a Bragg grating filter, it is possible to extract just the light that is either upshifted or down shifted in frequency. For the Mach-Zehnder modulator, the RF signal can be as high at 40 GHz.

In the case of the acousto-optic modulator an acoustic sound wave is generated in an optically transparent medium by use of a piezoelectric transducer and the applied RF. This sound wave provides a traveling Bragg grating with a period that corresponds to the RF and diffracts the incident light into an up shifted and/or down shifted light beam. The first order of diffraction is shifted in optical frequency by the RF, the second order of diffraction is shifted in optical frequency by twice the RF and so on. The acousto-optic modulator can use RF signal frequencies up to 2 GHz.

The output light from the optical frequency shifter is the first of the three transmitted beams. In the case of the Mach-Zehnder modulator frequency shifter, it is filtered by the narrow pass band optical filter 19 and delivered as the frequency shifted beam 24. This beam is carried by optical analog link 9.

A beam splitter or fiber optic coupler 26 sends a portion of the unshifted beam 22 into a first input port of a straight optical phase modulator 50 having an optical output 52. An analog communication voltage signal 46, such as a signal in the radio frequency (RF) range or a video signal, is amplified by analog signal driver 48 and applied to the electrical modulation input terminal of the straight optical phase modulator 50.

The straight phase modulator 50 is a linear optical device that comprises an electro-optic medium that has a refractive index that depends linearly on the voltage applied across the medium. Thus, the refractive index of the optical medium is dynamically changed according to the applied voltage signal. When the refractive index of the optical medium is changed, the "optical path length" is changed and this causes a change in the relative optical phase of the light delivered by the straight phase modulator (relative refers to the state of the phase at the output when there is an applied voltage compared to the state of the phase at the output when there is no applied voltage). Accordingly, the straight phase modulator 50 effects the state of the optical phase of the light delivered at output 52 so as to have a linear dependence with the applied voltage. By changing the optical path length it produces a phase modulated communication beam 54 that corresponds linearly with the analog communication voltage signal that is applied at 46.

In this patent the phrase "optical path length" is characterized and mathematically defined as the product of the physical propagation distance and the associated refractive index of the medium through which the light propagates. It should be recognized that adjusting the optical path length can be accomplished by adjusting the physical propagation distance or adjusting the index of refraction of the medium.

The remaining portion of the beam 22 is sent by beam splitter or fiber optic coupler 26 to reflector or mirror 28 which is preferably an approximately 45° mirror and reflects the beam, referred to as the reference light beam 30, out of the transmitter 7 and through the analog optical link 9.

In the preferred embodiment, the light beams 24, 30, and 54 are transmitted by the transmitter 7 through the analog optical link 9 via separate optical fibers. Alternatively, the link may be free space but the three beams must remain separate.

The receiver 8 receives the light beams 24, 30, and 54 after they pass through the analog optical link 9. More particularly, the reference beam 30 is reflected off 45° beam combiner 32 or optical fiber coupler. Simultaneously, the upshifted light beam 24 is applied through beam splitter or fiber optic coupler 42 so that a portion is directed to beam combiner 32 where it interferometrically combines with the reference beam 30 and is applied to photodetector 60. The beam combiner 34 combines the light from the frequency upshifted and the frequency unshifted beams so that the optical interference between the beams performs a heterodyne of these two optical frequencies which generates the beat frequency representative of the RF modulation frequency from RF source 18. Preferably, the optical path length of the two beams are equal. The beam splitter achieves this optical interference and performs the heterodyne by making the two beams co-linear and superimposed on each other, although other techniques, including fiber optic combining techniques, also can be used.

It should be recognized that the degree of coherence provided by the particular source used dictates the optical path lengths and the particular beam recombination geometry. Thus sources at various wavelengths, optical paths of different lengths and different mirror geometries may be employed. It is important, however, that the light from the two beams be combined so that the optical interference that occurs between the two beams performs the heterodyne which generates the beat frequency corresponding to the RF modulation frequency.

The photodetector 60 responds to the intensity variations of the combined beams by optically heterodyning the two optical frequencies to create the reference RF beat frequency signal. This is applied to divide chain path 62 as shown in dashed lines. In this way, an RF drive signal reference is generated in the receiver using optical interference. An amplifier 64 amplifies the detected RF beat frequency signal to a sinusoid at a preselected amplitude that can trigger a digitizing circuit. More particularly, a Schmidt trigger 66 converts the sinusoid into a digital waveform signal at 68 which corresponds to the RF beat frequency. However, other components that are functionally equivalent to a Schmidt trigger and that yield a signal that can be sent to a digital divider also can be used.

The digital waveform signal at 68 is then provided to a digital divider 70 that creates at its output 72 a square wave that is lower in frequency by the particular integer divisor used in the divide chain. Simple digital flip-flop dividers make it convenient to divide by a particular power of two. Mathematically, the square wave frequency is:

$$f/2^m, \text{ where } m=1, 2, 3, 4 \ldots$$

and f is the RF drive signal frequency. The power of two used for the division depends on the desired resolution of the phase. It will be apparent that division by integers, denoted as N, other than powers of two also will result in similar performance provided the output of the divider chain is a square wave and that both chains 62 and 76 divide identically. Division by powers of two is the preferred embodiment because of its simplicity and ease of implementation.

A portion of the upshifted light beam 24 is sent via the beamsplitter 42 to a beam combiner 74. Similarly, the phase modulated communication beam 54 is delivered to the beam combiner 74. The beam combiner 74 interferometrically combines the beams 24 and 54, performs a heterodyne of the optical frequencies, and applies the results to photodetector 75. The beam combiner 74 combines the light from the frequency upshifted and the phase modulated communication beams so that the optical interference between the beams performs an optical heterodyne that generates the beat frequency representative of the RF drive signal from oscillator 18. Preferably, the optical path length of the two beams are equal. The beam combiner achieves the optical interference by making the two beams co-linear and superimposed on each other, but other techniques, including fiber-optic combining techniques, can be used.

The photodetector 75 responds to the intensity variations in the interference of the combined beams, and by optically heterodyning the two optical frequencies the RF beat frequency signal is generated. The photodetectors in this invention are preferably PIN photodiodes, but other photodetectors such as avalanche photodiodes or photomultiplier tubes can be used. This beat frequency signal is applied to path 76 as shown in dashed lines. The particular state of phase of the detected RF beat frequency relative to the original RF drive signal reference corresponds directly to the particular state of phase of the phase modulated communication light beam 54. An amplifier 78 amplifies the detected RF beat frequency signal to a sinusoid at a preselected amplitude that can trigger a digitizing waveform. More particularly, a Schmidt trigger 80 converts the sinusoid into a digital waveform signal at 82 which corresponds to the RF beat frequency. However, other components that are functionally equivalent to a Schmidt trigger and yield a signal that can be sent to a digital divider also can be used.

The digital waveform signal at 82 is then provided to a digital divider 84 that creates at its output 86 a square wave that is lower in frequency by the particular integer divisor used in the divide chain. Just as was the case in divide chain 62, simple digital flip-flop dividers make it convenient to divide by a particular power of two. Mathematically, the square wave frequency is:

$$f/2^m, \text{ where } m=1, 2, 3, 4 \ldots$$

and f is the RF driver signal frequency. The power of two used for the division must be identical to that used in divider 70. It will be apparent that division by integers, denoted as N, other than powers of two also will result in similar performance provided the output of the divider chain is a square wave and that both chains 62 and 76 divide identically.

For analog communication signal frequencies less than 1 MHz, the digital dividers 70 and 84 can be FAST TTL flip-flops manufactured by Fairchild Corporation and designated as Model 74F74. For higher analog communication signal frequencies, the digital dividers 70 and 84 are made from ECL logic or digital GaAs or InP high speed integrated circuit logic which will enable analog communication signal frequencies up to 2 GHz. The two resulting square waves at 72 and 86 have an offset in their relative phase dependent on the original offset in phase that was created by the straight optical phase modulator 52.

Figure 2:
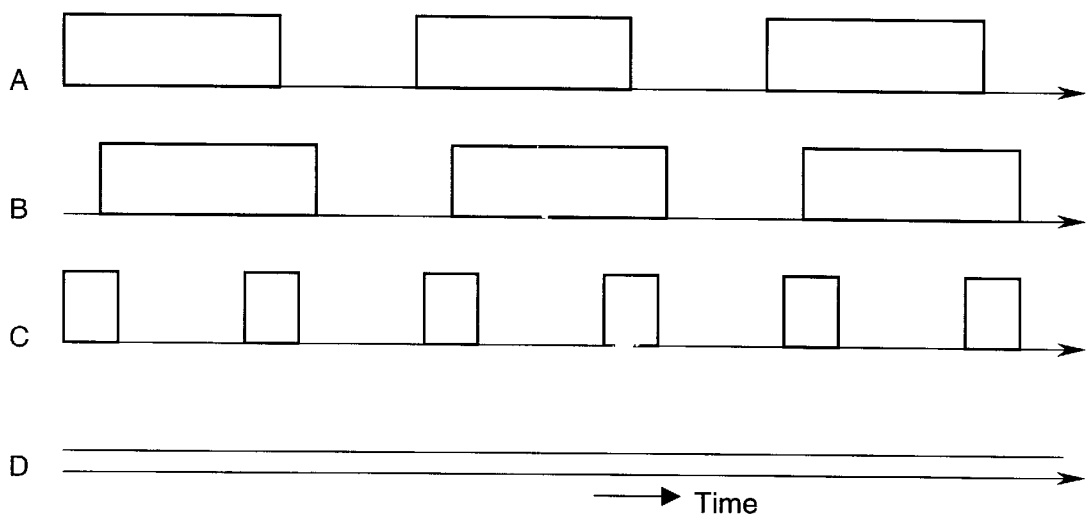
FIG. 2 is a timing diagram illustrating the waveforms developed at several elements in the receiver of the optical communication system illustrated in FIG. 1.

With reference now to FIG. 2 timing diagrams are shown for the signals appearing at the outputs 72 and 86 as they are processed through successive stages of the optical receiver. More particularly, the offset is shown by the displacement in the transitions in the timing diagram between the signal 72 at FIG. 2A, which is the divided square wave signal derived from the RF drive signal, and the signal 86 at FIG. 2B, which is the divided square wave signal from the phase modulated communication beam beat frequency. As illustrated one period of the square waves shown in FIGS. 2A and 2B is $2^m/f$. When these square wave signals are combined by an exclusive OR gate 90 it produces a pulse wave form shown by the signal at FIG. 2C, with a duty cycle dependent on the changed phase due to the straight optical phase modulator 50. This duty cycle is then sent through a low pass filter 92 that develops a DC voltage on its output as shown in FIG. 2D, having a magnitude that is dependent on the duty cycle. Preferably, the filter 92 is a conventional resistor capacitor integrator circuit that has a time constant that is less than the time transitions in the analog communication voltage signal applied at 46.

Figure 3:
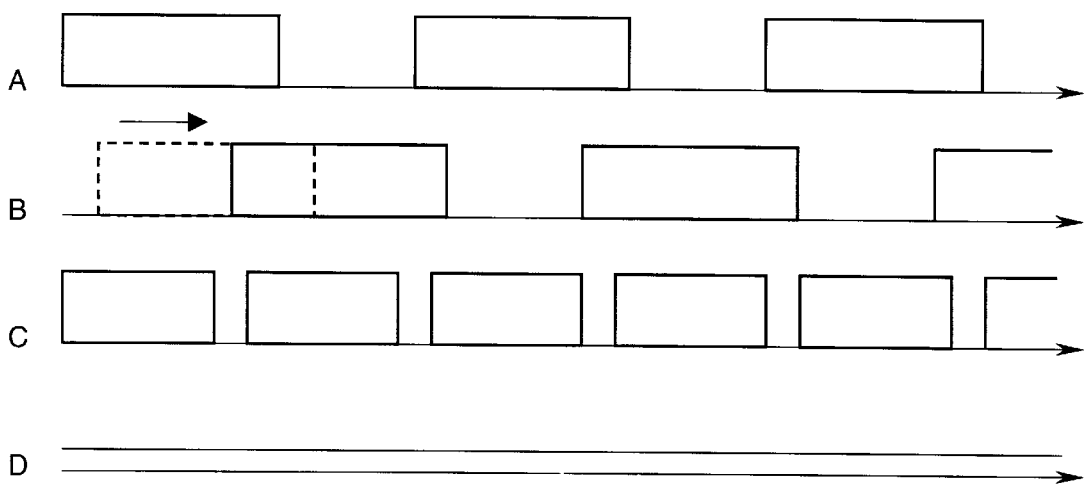
FIG. 3 is a timing diagram illustrating the waveforms developed at several elements in the receiver of the optical communication system after the state of phase of the phase modulated signal has been changed.
Figure 4:
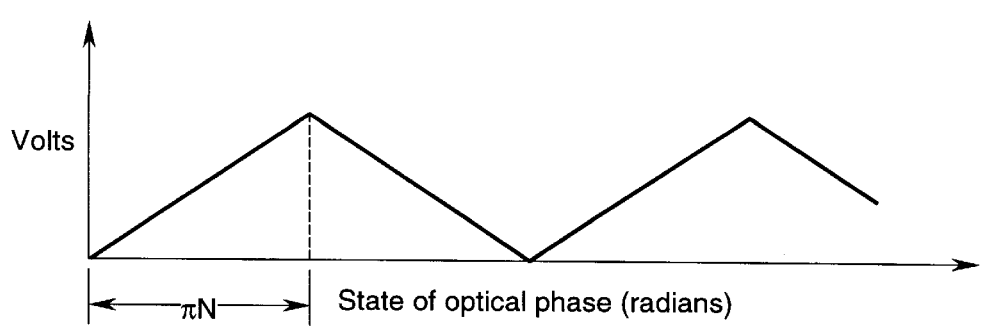
FIG. 4 is a plot of voltage versus state of optical phase representing the output signal produced by the optical receiver.

As shown in FIG. 3, new waveforms are created as a new interference pattern is developed by the optical receiver. This results in the square wave signal at FIG. 3B being developed by the digital divider 70. As shown the signal is displaced relative to the signal at FIG. 3A (and also to the signal shown in. FIG. 2B as illustrated by the dashed lines) and corresponds to the phase change. This leads to a new pulse wave form at the output of the exclusive OR gate 90 with an increased duty cycle as shown by the signal at FIG. 3C. This increased duty cycle creates a larger DC voltage at the output 94 of the low pass filter 92 as shown in FIG. 3D that has a linear dependence on the actual phase change. Plotting the voltage at the output 94 as a function of the state of optical phase in radians of the phase modulated communication beam leads to a repeating linear triangular wave form that spans several optical wavelengths of phase change as shown in FIG. 4. Note that in FIG. 4 the independent variable is the state of optical phase in radians (not time as shown in FIGS. 2 and 3) and that the voltage increases linearly from a minimum to a maximum when the state of optical phase is changed by $\pi N$ radians. For the special case of division by powers of two, this is also equal to $\pi 2^m$ radians, where m is the integer power of two used in the divide chains 62 and 76.

Also note that the linear triangular pattern repeats after the phase has changed by several wavelengths of optical phase. In normal use the division ratio will be chosen to that the multiple wavelengths of phase change all takes place on a single slope or segment of the response curve of FIG. 4, thus giving a linear response without passing over the peaks or valleys of the triangle wave, thereby avoiding ambiguity. Since the state of optical phase in the phase modulated communication beam has a direct linear correspondence to the analog communication signal, the output voltage at 94 will have a direct linear correspondence to the analog communication voltage signal applied at input 46.

Figure 5:
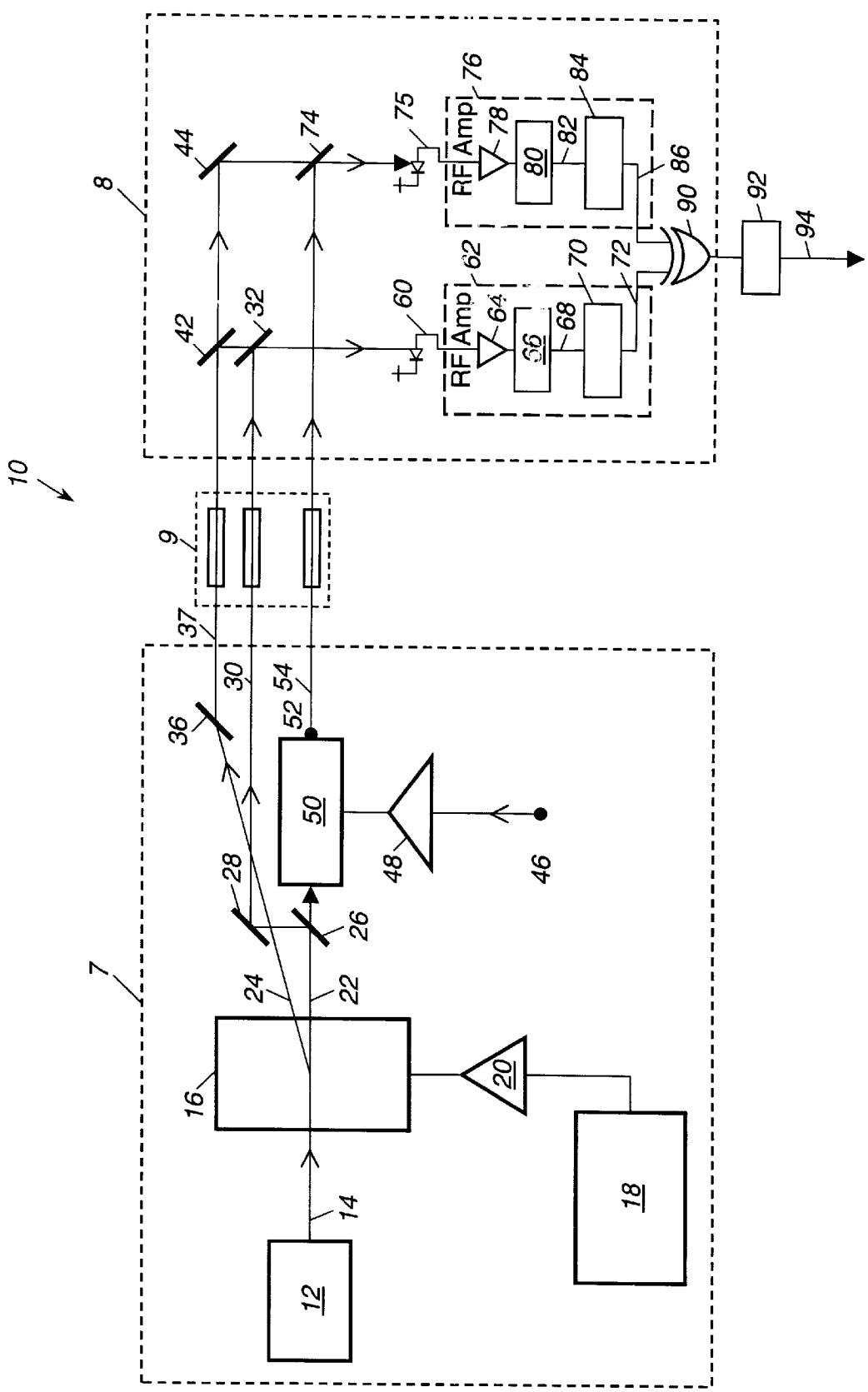
FIG. 5 is a schematic block diagram of the optical communication system, according to another embodiment of the present invention.

Referring now to FIG. 5, an alternative embodiment of the optical communication system 10 is illustrated. many of the parts of the system 10 are identical in construction to like parts in the system illustrated in FIG. 1 described above, and accordingly, there have been applied to each part of the system in FIG. 5 a reference numeral corresponding to the reference numeral that was applied to the like part of the system described above and shown in FIG. 1.

The fundamental difference between the system 10 of FIGS. 1 and 5 is that this embodiment shows the application of an acousto optic modulator as a frequency shifter. This type of frequency shifter does not require a narrow band optical filter.

The acousto-optic modulator 16 creates an acoustic sound wave that forms a traveling Bragg grating and generates two optical beams 22 and 24 from the modulated beam of light. The optical beam 22 comprises the unshifted zeroth order beam of transmitted coherent light at frequency v that passes directly through the modulator 16 and the optical beam 24 is a first order Bragg diffracted beam that is up shifted in optical frequency by the RF modulation frequency (v+40 MHz) and is directed at the Bragg diffraction angle. Alternatively, both beams can be shifted. In any event the beam 24 is separated from the beam 22.

In addition, the acousto-optic modulator 16 can generate other beams that can be used besides the unshifted beam 22 and the upshifted beam 24 shown in FIG. 1. In particular, it is possible to use a down-shifted beam (not shown) that can be generated by the acousto-optic modulator in place of the upshifted beam, or to shift both beams.

The upshifted beam 24 is reflected off mirror 36 via a grazing incident reflection to deliver the transmitted shifted beam 37. Simultaneously, the reference light beam 22 is reflected off beam splitter 26 to the mirror 28 where it delivers the transmitted reference beam 36. In addition, the reference light that is transmitted through the beam splitter 26 is sent to the straight phase modulator 50 to create the transmitted phase modulated beam 54. These three beams are conveyed by link 9 to the optical receiver. There the light is processed exactly as it was in FIG. 1.

Accordingly the present invention provides a voltage signal that varies linearly according to the optical state of phase of the communication light beams, and hence corresponds to the analog communication signal.

Obviously, many modifications and variations of the present invention are possible in view of the above teachings. Thus, it is to be understood that, within the scope of the appended claims, the invention may be practiced otherwise than as specifically described above.

What is claimed is:

1. An optical communication system using a radio frequency (RF) signal for communicating an analog communication signal comprising:

an optical transmitter comprising:

means for generating a reference light beam;

means for generating a shifted light beam that is shifted in frequency relative to the frequency of said reference light beam by a predetermined radio frequency (RF); and means responsive to the analog communication signal and operative to produce a communication light beam having phase modulation corresponding to the analog communication signal; and an optical receiver comprising:

first means responsive to said reference light beam and said shifted light beam and operative to interferometrically combine said reference light beam with said shifted light beam to provide a first heterodyne signal;

second means responsive to said first heterodyne signal and operative to produce a first electrical signal at the optical beat frequency corresponding to the RF;

third means responsive to said communication light beam and said shifted light beam and operative to interferometrically combine said communication light beam with said shifted light beam to provide a second heterodyne signal including information regarding the state of phase of the communication light beam;

fourth means responsive to said second heterodyne signal and operative to produce a second electrical signal at the optical beat frequency corresponding to the RF and with a phase corresponding to the state of phase of the communication light beam; and fifth means responsive to said first and said second electrical signals and operative to provide an output signal that has a linear correspondence to the state of optical phase of said communication light beam and the analog communication signal.

2. The optical communication system as set forth in claim 1, wherein said output signal has a magnitude that varies linearly relative to the state of optical phase of said communication light beam.

3. The optical communication system as set forth in claim 1, and further comprising means for generating a radio frequency (RF) signal, means for generating an optical signal to provide said reference light beam, and optical frequency shifting means responsive to said optical signal and said RF signal and operative to provide said shifted light beam, which is shifted in frequency by an amount corresponding to the RF.

4. The optical communication system in claim 3, wherein said optical frequency shifting means comprises an acousto-optic modulator.

5. The optical communication system in claim 3, wherein said optical frequency shifting means includes a Mach-Zehnder modulator and a narrow pass band optical filter.

6. The optical communication system as set forth in claim 3, wherein said means for generating an optical signal is a helium neon laser.

7. The optical communication system as set forth in claim 3, wherein said means for generating an optical signal is a diode laser.

8. The optical communication system as set forth in claim 1, wherein said fifth means includes sixth means for converting said RF signal into a first digital waveform, a first digital divider for dividing said first digital waveform by a predetermined integer to form a first square wave, seventh means for converting said electrical signal into a second digital waveform, a second digital divider for dividing said second digital waveform by said same predetermined integer to form a second square wave, eighth means includes an exclusive OR circuit for processing said first and said second divided square waves to form a pulse waveform, and ninth means for integrating said processed pulse waveform to provide said output signal having a magnitude that varies linearly relative to the state of optical phase of said communication light beam.

9. The optical communication system as set forth in claim 8, wherein said circuit means includes an exclusive OR circuit for providing a pulse waveform having a duty cycle that reflects the relative phase between the divided RF signal and the divided electrical signal and an integrating circuit for developing said output signal.

10. The optical communication system as set forth in claim 8, wherein said output signal has an increasing magnitude over the change in the state of the optical phase equal to the product of $\pi$ radians of phase change and the divisor of the said digital dividers.

11. The optical communication system as set forth in claim 8, wherein said output signal magnitude varies linearly from a minimum to a maximum when the state of optical phase is changed by $\pi 2^m$ radians, where m is an integer.

12. The optical communication system as set forth in claim 8, wherein said output signal magnitude varies linearly from a minimum to a maximum when the state of optical phase is changed $\pi N$ radians, where N is an integer.

13. The optical communication system as set forth in claim 1, wherein said fifth means includes means for generating a pulse waveform having a duty cycle that reflects the relative optical phase state of the analog communication signal.

14. The optical communication system as set forth in claim 8, and further comprising means for filtering said pulse waveform to produce said output signal.

15. An optical transmitter for communicating an analog communication signal comprising:

means for generating a reference light beam;

means for generating a shifted light beam that is shifted in frequency relative to the frequency of said reference light beam by a predetermined radio frequency (RF); and means responsive to the analog communication signal, said means responsive to the analog communication signal including means for generating a communication light beam having a phase modulation corresponding to the analog communication signal.

16. The optical transmitter as set forth in claim 15, wherein said means for generating a shifted light beam comprises an acousto-optic modulator.

17. The optical transmitter as set forth in claim 15, wherein said means for generating a shifted light beam includes a Mach-Zehnder modulator and a narrow band pass optical filter.

18. The optical transmitter as set forth in claim 15, wherein said means for generating a reference light beam comprises a helium neon laser.

19. The optical transmitter as set forth in claim 15, wherein said means for generating a reference light beam comprises a diode laser.

20. The optical transmitter as set forth in claim 15, wherein said means responsive to the analog communication signal comprises a straight phase modulator.

21. The optical transmitter as set forth in claim 20, wherein said straight phase modulator comprises means for changing an optical path length of the communication light beam.

22. An optical receiver for receiving a reference light beam, a shifted light beam that is shifted in frequency from the frequency of the reference light beam by a predetermined radio frequency (RF), and a communication light beam having phase modulation corresponding to an analog communication signal, comprising:

first means responsive to the reference light beam and the shifted light beam and operative to interferometrically combine said reference light beam with said shifted light beam to provide a first heterodyne signal;

second means responsive to said first heterodyne signal and operative to produce a first electrical signal at the optical beat frequency corresponding to the RF;

third means responsive to said phase modulated communication light beam and said shifted light beam and operative to interferometrically combine said phase modulated communication with said shifted light beam to provide a second heterodyne signal including information regarding the state of phase of the communication light beam signal;

fourth means responsive to said second heterodyne signal and operative to produce a second electrical signal at the optical beat frequency corresponding to the RF and with a phase corresponding to the state of phase of the communication light beam signal, and fifth means responsive to said first and said second electrical signals and operative to provide an output signal that corresponds to the state of optical phase of said communication light beam and the analog communication signal.

23. The optical receiver as set forth in claim 22, wherein said output signal has a magnitude that varies linearly relative to the state of optical phase of said communication light beam.

24. The optical receiver as set forth in claim 22, wherein said fifth means includes sixth means for converting said first electrical signal into a first digital waveform, a first digital divider for dividing said first digital waveform by a predetermined integer to form a first square wave, seventh means for converting said second electrical signal into a second digital waveform, a second digital divider for dividing said second digital waveform by said same predetermined integer to form a second square wave, eighth means includes an exclusive OR circuit for processing said first and said second divided square waves to form a pulse waveform, and ninth means for integrating said processed pulse waveform to provide said output signal having a magnitude that varies linearly relative to the state of optical phase of said communication light beam.

25. The optical receiver as set forth in claim 24, wherein said output signal magnitude varies linearly from a minimum to a maximum when the state of optical phase is changed by $\pi 2^m$ radians, where m is an integer.

26. The optical receiver as set forth in claim 24, wherein said output signal magnitude varies linearly from a minimum to a maximum when the state of optical phase is changed $\pi N$ radians, where N is an integer.

27. The optical receiver as set forth in claim 22, wherein said fifth means includes a first digital divider and a second digital divider, said digital dividers serving to divide the said first and second digital waveforms by N, where N=1, 2, 3, 4 to form said first and second square waves, and circuit means responsive to the divided first and second square waves and operative to produce said output signal.

28. The optical receiver as set forth in claim 22, wherein said fifth means includes a first digital divider and a second digital divider, said digital dividers serving to divide the said first and second digital waveforms by $2^m$, where m is any integer to form said first and second square waves, and circuit means responsive to the divided first and second square waves and operative to produce said output signal.

29. The optical receiver as set forth in claim 27, wherein said circuit means includes an exclusive OR circuit for providing a pulse waveform having a duty cycle that reflects the relative phase between the first divided square wave and the second divided square wave signal and an integrating circuit for developing said output signal.

30. The optical receiver as set forth in claim 29, wherein said output signal has a magnitude that varies linearly relative to the state of optical phase of said communication light beam.

31. The optical receiver as set forth in claim 29, wherein said output signal has an increasing magnitude over the change in the state of the optical phase equal to the product of $\pi$ radians of phase change and the divisor of the said digital dividers.

32. The optical receiver as set forth in claim 29, wherein said output signal magnitude varies linearly from a minimum to a maximum when the state of optical phase is changed by $\pi 2^m$ radians, where m is an integer.

33. The optical receiver as set forth in claim 29, wherein said output signal magnitude varies linearly from a minimum to a maximum when the state of optical phase is changed $\pi N$ radians, where N is an integer.

34. The optical receiver as set forth in claim 22, wherein said fifth means includes means for generating a pulse waveform having a duty cycle that reflects the relative optical phase state of the analog communication signal.

35. The optical receiver as set forth in claim 22, and further comprising means for filtering said pulse waveform to produce said output signal.

* * * * *